(12) United States Patent
Keller et al.

(10) Patent No.: US 6,367,503 B1
(45) Date of Patent: Apr. 9, 2002

(54) PLASTIC CONTAINER AND METHOD FOR USING THE SAME

(75) Inventors: Dieter Keller, Aschaffenburg; Martin Maasz, Sulzbach; Karl Eck, Frankfurt; Christian Kochsmeier, Dortmund, all of (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/462,340

(22) PCT Filed: Jun. 19, 1998

(86) PCT No.: PCT/EP98/03755

§ 371 Date: Apr. 3, 2000

§ 102(e) Date: Apr. 3, 2000

(87) PCT Pub. No.: WO99/02327

PCT Pub. Date: Jan. 21, 1999

(30) Foreign Application Priority Data

Jul. 9, 1997 (DE) .......................... 197 29 261
Jun. 5, 1998 (DE) .......................... 198 25 104

(51) Int. Cl.⁷ .......................... B29C 45/17; B60K 15/03
(52) U.S. Cl. .......................... 137/574; 137/587; 123/468; 123/469; 123/514; 220/86.2
(58) Field of Search .................. 137/574, 576, 137/587; 220/86.2; 123/468, 469, 509, 510, 514

(56) References Cited

U.S. PATENT DOCUMENTS

| | | | | |
|---|---|---|---|---|
| 2,115,016 A | * | 4/1938 | Ehlers ........................ | 220/86.2 |
| 4,135,562 A | * | 1/1979 | Martineau et al. ...... | 220/86.2 X |
| 4,444,333 A | * | 4/1984 | Anhegger .............. | 220/86.2 X |
| 4,625,777 A | * | 12/1986 | Schmidt ................ | 220/86.2 X |
| 4,714,171 A | * | 12/1987 | Sasaki et al. .......... | 220/86.2 X |
| 4,877,147 A | * | 10/1989 | Hyde ......................... | 220/746 |
| 4,891,000 A | * | 1/1990 | Ishii ...................... | 220/86.2 X |
| 5,127,432 A | * | 7/1992 | Duhaime et al. ........... | 137/574 |
| 5,343,902 A | * | 9/1994 | Ramioulle ............. | 220/86.2 X |
| 5,704,337 A | * | 1/1998 | Stratz et al. ........... | 220/86.2 X |

FOREIGN PATENT DOCUMENTS

| | | |
|---|---|---|
| DE | 9016703 U | 2/1991 |
| DE | 19637925 A | 3/1997 |
| GB | 2158002 A | 11/1985 |

OTHER PUBLICATIONS

Patent Abstracts of Japan, vol. 016, No. 343 (M–1285), Jul. 24, 1992 & JP 04 103317 A (NIFCO INC), Apr. 6, 1992, siehe Zusammenfassung.

* cited by examiner

*Primary Examiner*—John Rivell
(74) *Attorney, Agent, or Firm*—David M. Thimmig; Mayer, Brown, Rowe & Maw

(57) ABSTRACT

A plastic tank comprises a line which is connected at least in certain sections to its wall and is formed in one piece with the plastic tank. For its production, the plastic tank is injection-moulded between a hollow mould and an inner mould inserted into the latter, the mould having a recess, in which a sprue body is formed as the starting material for the line. Before this sprue body can solidify completely, material is blown out from it by means of the internal gas pressure or pressure blowing technique via channels provided in the mould, so that the required line is created there. The lines may be arranged on the outside and/or inside and parallel and/or at an angle to the tank walls.

16 Claims, 3 Drawing Sheets

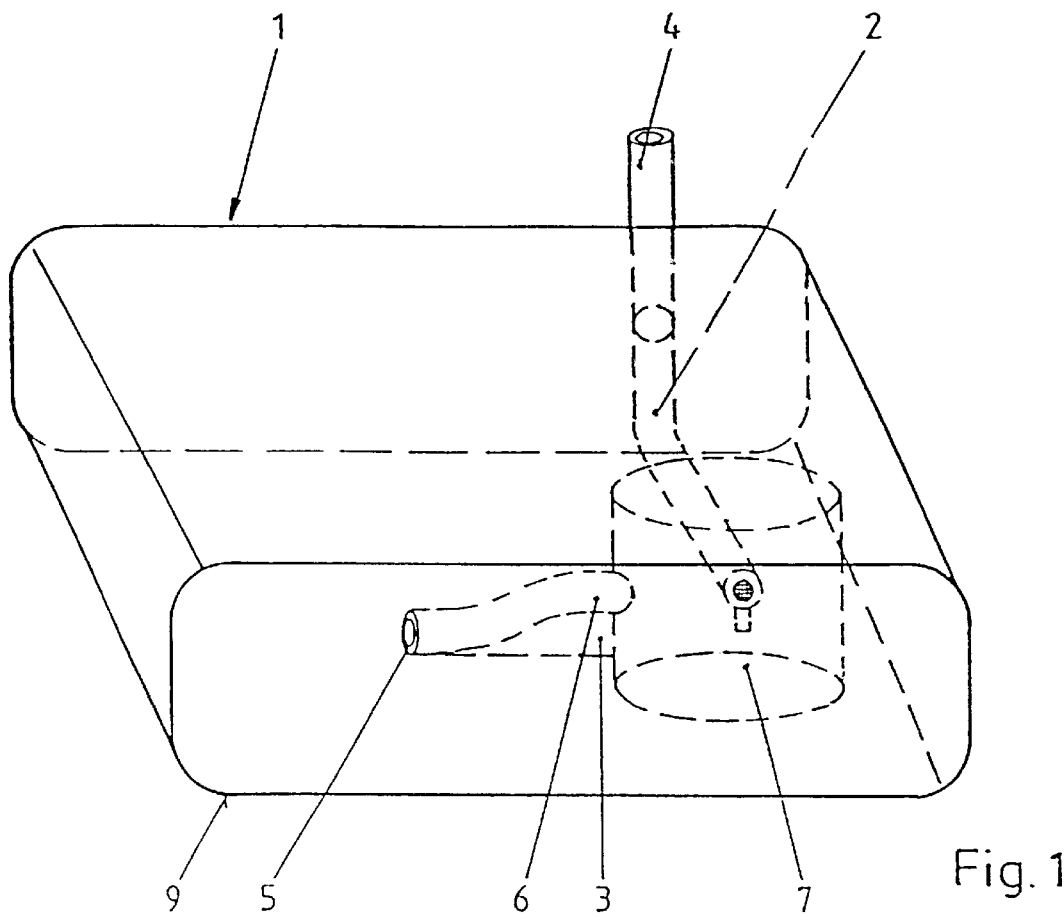
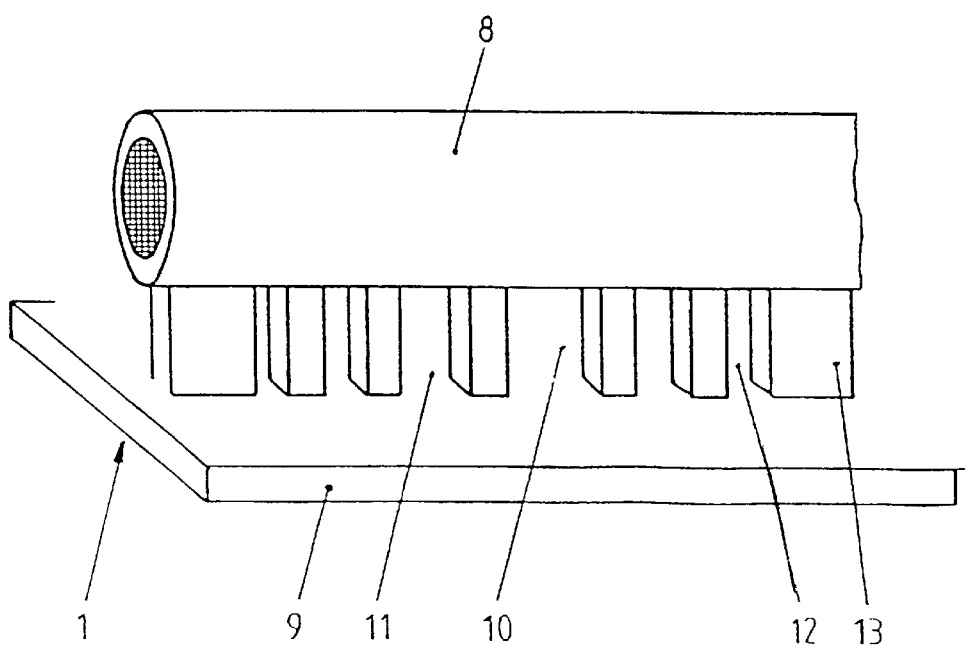

PLASTIC CONTAINER AND METHOD FOR USING THE SAME

BACKGROUND OF THE INVENTION

The invention relates to a plastic tank, in particular a fuel tank of a motor vehicle, having a media-carrying line. Furthermore, the invention relates to a process for the production of such a plastic tank.

Plastic tanks of this kind, designed as fuel tanks, are used in modern motor vehicles and are therefore known. They comprise media-carrying lines, which currently have to be inserted into the container interior and fastened therein via a filling opening or via special assembly openings after the tank has been produced. For example, a line has to be disposed in the region of the tank bottom of the fuel tank as an intake line for a fuel pump. In order that an adequate supply of fuel is ensured under all possible operating conditions, this line must lead to the deepest point of the fuel tank and also should not alter its position when the vehicle is being driven. With the present plastic tanks, this can be achieved only with relatively great expenditure, so the production of such tanks is expensive. Nevertheless, there is the risk of the position of the installed parts altering during adverse driving conditions and then, for example, no more fuel is taken in before the fuel tank is really empty. Plastic tanks of this type are often produced by the blow-moulding process. In this process, a freshly extruded pipe is subjected to internal pressure in a hollow mould, so that its wall comes to bear against the wall of the hollow mould. This process has the disadvantage that particular formations of the interior are possible only to a very restricted extent, in particular no fixed line internals can be realized.

If it is wished to mould components onto the inside wall of an injection-moulded tank, up until now such tanks have been created from at least two shells produced by the injection-moulding process. For producing each shell, use is made of a hollow mould into which an inner mould engages in such a way that only the regions which are to form the wall and any moulded-on components after the injection of the plastic remain free. Even in the case of such an injection-moulding process, until now it has not been possible to make components provided in the interior of the plastic tank of a hollow form.

In the case of a known process for producing plastic injection mouldings (EP 0 745 468), a hollow body is created by filling the cavity of a hollow mould with injection moulding compound and subsequently subjecting the mould cavity to compressed gas (internal gas pressure technique). In this process, the still soft injection moulding compound is pressed against the inner side of the injection mould. Once the injection moulding compound has solidified on the mould wall, the gas is discharged via a duct and a switchable valve. As this happens, the gas flow tears into the wall of the plastic container an outwardly leading outlet. This serves merely for faster discharge of the compressed gas. It cannot be used to create an interior material projection or a cavity profile parallel to a tank wall.

One disadvantageous aspect of the process described is that at least two further openings are required in the wall of the integral hollow body for filling it with and emptying it of gas. These openings must be closed in a further operation. A further disadvantageous aspect is that, with the process described, no further components can be arranged in the interior of the hollow body, for example lines along an inside wall, without breaking through the wall of the surrounding tank. Lines required internally would have to be laid and fixed in an additional operation, as in the case of the prior art mentioned at the beginning, necessitating a large number of connecting elements between the sections of line and fastening elements.

SUMMARY OF THE INVENTION

The invention is based on the problem of developing a plastic tank of the type mentioned at the beginning which can be produced at low cost and in which the position of lines built on or in is reliably fixed. Furthermore, a process for the production of such a tank is to be specified.

The first-mentioned problem is solved according to the invention by at least one section of the media-carrying line being moulded onto a wall of the plastic tank. This may lie on the inside or outside and/or penetrate the wall.

Such a plastic tank according to the invention requires only a small number of connecting elements on account of the lines integrally formed with the wall of the plastic tank. By dispensing largely with assembly work, the plastic tank can be produced at particularly low cost. Furthermore, the integral design achieves the effect that the lines are inevitably fixed in their position and cannot alter their position. Therefore, the plastic tank according to the invention is particularly suitable as a fuel tank. Use as a fuel tank is appropriate because of the large number of lines, in particular fuel, air-admitting and venting lines in the interior of the fuel tank, which are intended to ensure an adequate supply of fuel to the engine even on steep inclines and when there are great variations in temperature, while at the same time meeting high safety requirements.

Furthermore, fuel must not escape either in the event of an accident or by permeation. The special nature of the plastic tank according to the invention makes this possible. It has regions of high rigidity and regions of high elasticity. At the same time, the number of connecting elements is reduced.

In the case of the plastic tank according to the invention, the lines can also be provided where their subsequent assembly was not possible, or only with very great expenditure, in the case of the previous plastic tanks. Finally, the possibility of lines being incorrectly routed due to assembly errors is ruled out.

Furthermore, the mechanical properties of the plastic tank can be improved in a particularly beneficial way by the direct, reinforcing attachment of the line to the wall of the plastic tank. In particular, the strength of the wall can be increased many times over in partial respects by the specifically selected design of the line and its routing parallel to a wall.

The effect of improved mechanical properties can be additionally increased significantly if the media-carrying line is moulded onto the plastic tank with a web interposed. The effect of the rib-like reinforcement formed by a web brings about a considerable increase in the wall rigidity of the plastic tank in the partial region concerned. The web may in this case perform further functions, such as for example influencing the direction of flow in the line or else serve assembly purposes.

The mechanical properties can be influenced in a particularly advantageous way in any desired sections of the line if the web has at least one aperture. The rigidity reduced in this region allows in particular the design of a plastic tank with particularly elastic properties. Consequently, a plastic tank which has high rigidity in some partial regions but at the same time can be elastically deformed particularly well in other partial regions can be realized. In the region of any undercuts of the web with respect to the line cross-section, the mould will be made with corresponding divisions.

A further exemplary embodiment of the invention, in which the web varies in thickness or height in different regions over its length, permits a largely free design of the line. As a result, even with the line following an essentially planar path, it is possible for example for specifically selected stiffening to be realized by reinforcing the web. In particular, the requirements for the flow behaviour of the medium carried in the line can be taken into account in this case without influencing the stiffening effect. It is also easily possible in particular for inclines or slopes with fixed angles of inclination to be represented.

Depending on what is required, it is important that the plastic tank is not stiffened by attached components. This is the case, for example, if the plastic tank is exposed to deforming forces, and therefore must be elastically deformable. One particular embodiment of the invention meets such requirements if the line is attached to the plastic tank only in the region of a connection opening. In this case, the line runs largely freely in the interior and is connected to the wall of the plastic tank only where it penetrates the wall, or is connected to a connection element. In this way, an absolutely sealed lead-through of the line is created right at the original moulding stage of the tank.

Another particularly advantageous development of the invention is provided by a connecting element being moulded onto the media-carrying line. As a result, the assembly expenditure can be reduced, since it is possible to dispense with the laborious subsequent fastening of separate connecting elements. Further connection elements can therefore be connected to the line without any problem, for example by means of a connecting element designed as a plug-in connection. In this case, incorrect assembly is at the same time largely ruled out.

A particularly favourable embodiment is provided in this case by the connecting element having a plug to be positively connected to a coupling. The positive connection produces a largely sealed connection, which may, for example, also be made releasable. It is also possible in this case to provide an amount of tolerance such that axial mobility is achieved. It is thus possible to compensate for both production tolerances and operationally induced deformations of the plastic tank and therefore prevent in particular these from causing the connecting element to be damaged or to leak.

It is also advantageous if the connecting element is designed for the connection of a sucking jet pump. The sucking jet pump, to be introduced into the plastic tank as a separate component, may therefore, as a largely prefabricated component, be already equipped with a corresponding coupling element, so that the sucking jet pump can be inserted directly into the plastic tank. In this case, the sucking jet pump can be easily connected by virtue of the integrally moulded-on connecting element and the resultant, largely stiff type of design, since the connecting element does not have to be additionally fixed for this purpose.

It is also particularly appropriate in this case if the connecting element is designed at the same time for fixing a connected component. As a result, the connecting element may serve simultaneously for the connection of the component to the media-carrying line and also for its positioning. This dispenses with the need for further fixing means and reduces the assembly expenditure.

A development of the invention is particularly favourable if the media-carrying line is arranged in a first half-shell of the plastic tank and the connecting element is designed for the connection of a further media-carrying line, arranged in a second half-shell. As a result, the lines arranged in two initially separate half-shells are connected to each other at the same time as the half-shells are joined together to form the plastic tank. The lines may in this case also be arranged in particular in a way which is not dependent on subsequent accessibility to the interior of the plastic tank. It is hence possible to dispense with the assembly openings otherwise required for this purpose, so that a much-simplified design of the plastic tank can be achieved.

The second-mentioned problem, that is of providing a process for the production of a plastic tank, in particular a fuel tank of a motor vehicle, which comprises a media-carrying line connected in certain sections to its wall, is solved according to the invention by the plastic tank comprising two half-shells respectively produced by the injection-moulding process in a hollow mould by means of an inner mould inserted in the latter and designed as a core, a shaping of the mould having the effect that along one wall of the plastic tank at least one sprue body is moulded on in one piece with the tank wall or is integrally connected to it, and by this body subsequently being formed into a hollow body, forming the line, by feeding in and carrying away a pressurized gas via channels of the mould by means of the internal gas pressure technique. Material accumulations away from the contact surfaces between the injection moulding compound and the mould cool down relatively more slowly and can consequently still be removed.

In the case of this process according to the invention, the injection moulding process, known per se, and the customary internal gas pressure technique are combined with each other in a particularly advantageous way and used for producing even internal lines. The half-shell is created by filling the space between the hollow mould and the inner mould with injection moulding compound.

The tanks in question are mass-produced parts. Therefore, even relatively high expenditure in mould making is comparatively cheaper than the operations for subsequent installation of the lines, in particular with regard to the distinct reduction in the failure rate. By application of the process according to the invention, all the required lines in the interior can be moulded on directly in a single operation. This dispenses with additional working steps for the assembly and connection of the lines. Furthermore, the integral or one-piece design overcomes various sealing problems.

In a development of this process, the outer surface or surrounding area of the said sprue body is preferably cooled in the mould, in order that its outer wall solidifies preferentially before the compressed gas is blown into the corresponding mould channels and the core of the sprue body is blown out along the desired path. It is also of advantage that, according to a development, the mould or the profile of the hollow space in the sprue body may be made not only rectilinear but also angled or curved.

BRIEF DESCRIPTION OF THE DRAWINGS

The plastic tank and the process according to the invention allow various modifications. For further illustration of the invention, reference is made below to the drawing, in which:

FIG. 1 shows a perspective representation of a plastic tank according to the invention with an internal line, FIG. 2 shows a section of line with a web having an aperture.

DETAILED DESCRIPTION OF THE PREFERRED EMBODIMENTS

Figure 3:
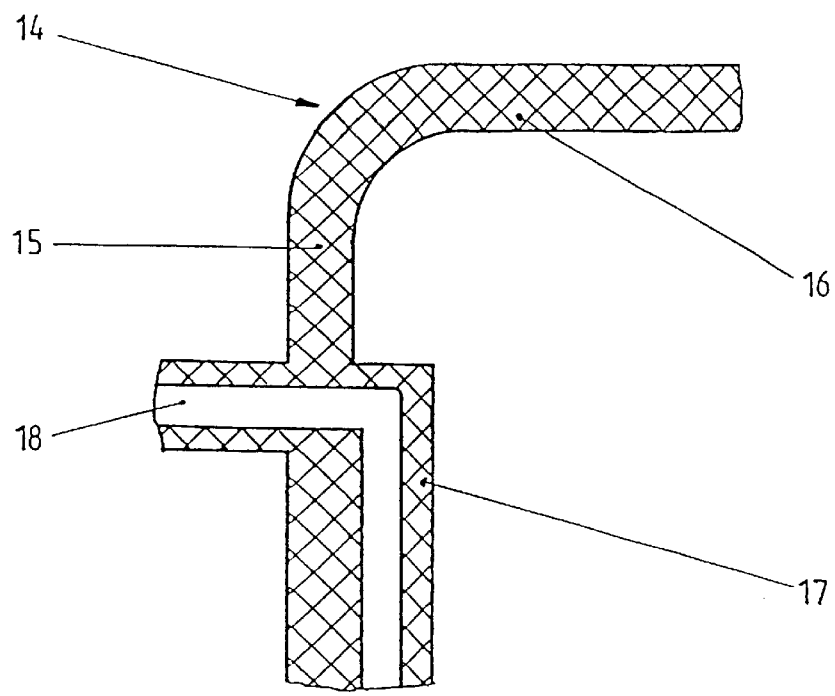
FIG. 3 shows a sectional representation of a plastic tank with a connection element.

FIG. 1 shows a perspective representation of a plastic tank 1 with a line 2 which is internal in certain sections and has an opening 4 outside the plastic tank 1 and an opening 5 inside the plastic tank 1, near the tank bottom 9 of the latter. The line 2 runs from the opening 4 initially vertically along the outer side of the plastic tank 1 and then leads into the interior of the latter. From the other opening 4, the line 2 runs initially near the tank bottom 9 of the plastic tank 1. It is connected to the tank bottom 9 by a web 3.

Shown in a merely schematic form, and connected to the line sections of the line 2, is an installed element 7, for example a fuel feed unit. In a rising section 6, towards the installed element 7, the line 2 is attached to the tank bottom 9 by means of the web 3.

FIG. 2 shows a section of a line 8 which is arranged on a portion of the tank bottom 9 of the plastic tank 1 (otherwise not shown) and runs parallel to the tank bottom. An attachment of the line 8 has a plurality of apertures 10, 11, 12, which permit specifically selected stiffening or elasticity of the tank bottom 9. In this case, the wide aperture 10 brings about an only slight stiffening in comparison with the narrower apertures 11, 12, by contrast with a strong stiffening in the case of the particularly narrow aperture 12 or a web 13 having no apertures.

FIG. 3 shows a sectional representation of a plastic tank 14 with an inner tank wall 16 and an outer tank wall 15. Moulded onto the outer tank wall 15 is a connection opening 18, while a line 17 is directly connected to the inner tank wall 15 and extends parallel to the wall. This has the result that the line 17 can run with certain sections both in the interior of the tank and outside the wall of the latter and passes the said wall as a lead-through.

Figure 4:
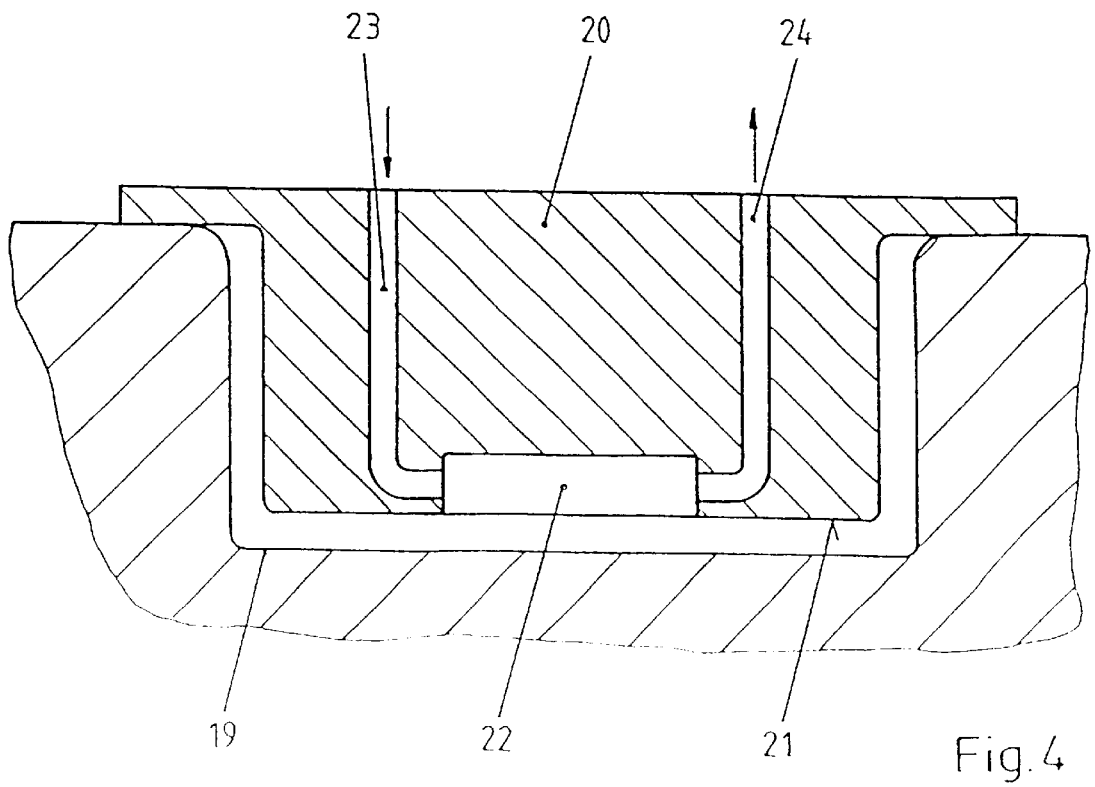
FIG. 4 shows a sectional representation through a two-part mould along with gas channels for producing a half-shell of the tank.

To illustrate the production process, reference is now made to FIG. 4. This shows a hollow mould 19, into which an inner mould 20 has been inserted from above as a core. The said inner mould has in its bottom surface 21 a recess 22, which extends essentially parallel to the wall of the outer mould and corresponds to the outer contour of a line to be created on the bottom of the tank. Provided in the inner mould 20 is a compressed gas channel 23, which leads up to in front of one end face of the recess 22. Furthermore, the inner mould 20 has an outlet line 24, which ends in front of the other end face of the recess 22.

For producing a half-shell of a plastic tank, a compound of plastic is injected into the space between the hollow mould 19 and the inner mould 20. As a result, the recess 22 is also filled with a volume of plastic, which forms an elongated gating or sprue body. Before this can cure completely, compressed gas is fed to it on one end face via the compressed gas channel 23. This gas then blows the still liquid plastic inside the sprue body via the outlet line 24 to the outside, so that a hollow space which can be used as a line is created inside it. As already mentioned, if appropriate, coolant channels or spaces are to be arranged in the mould 19, 20, which are not shown here.

By this process, sprue bodies can also be made as a body penetrating a wall and blown hollow thereafter. For creating a rectilinearly penetrating or, as shown in FIG. 3, angled-away line profile by blowing out the core of the sprue body concerned, there can of course, in a way departing from FIG. 4, be channels provided for the compressed gas both in the inner mould and in the outer mould. There will also be provided inside the (outer and inner) moulds corresponding—not shown—coolant channels or spaces, by means of which the wall regions of the sprue body or the line to be produced are cooled preferentially after injecting the compound of plastic. These regions then solidify distinctly faster than the internal material accumulation of the compound of plastic, which is known to have poor thermal conduction. When compressed gas is blown through, it takes the path of least resistance through the still liquid or at least soft core compound, but leaves the already cured walls unaffected. After the complete curing of both half-shells, they are unified in a known way to form the complete tank, for example are undetachably connected to each other by a weld running around along their abutting edges.

Figure 5:
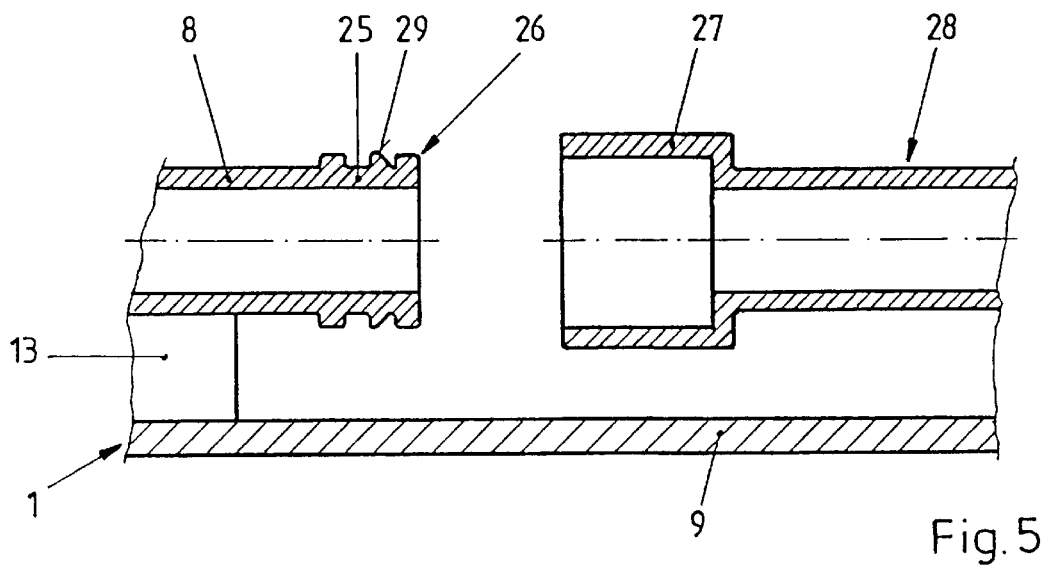
FIG. 5 shows a sectional representation of the section of line shown in FIG. 2, with a connecting element.

FIG. 5 shows in a sectional representation a section of the line 8 of the plastic tank 1 shown in FIG. 2 and connected to the tank bottom 9. The line 8 arranged on the tank bottom 9 by means of the web 13 has in this case a connecting element 26 which is provided with a plug 25 and is designed for the connection of a component 28 which is provided with a coupling 27 and may be, for example, a sucking jet pump. The plug 25 is in this case moulded directly onto the line 8, so that the assembly of the component 28 takes place by simply plugging the plug 25 together with the coupling 27. The plug 25 has a sealing lip 29, which makes possible an adequately sealed connection in the low-pressure range of the fuel system, it being possible in particular also for the seal of the connecting element 26 to be improved by selecting the same material. For more demanding requirements for the seal, a sealing ring (not illustrated) can be additionally fitted onto the plug 25. In the case of the embodiment represented, the plug 25 is held displaceably in the coupling 27 in such a way that axial play is achieved, in particular to compensate for production tolerances, and, as a consequence, assembly and disassembly can be further simplified.

Figure 6:
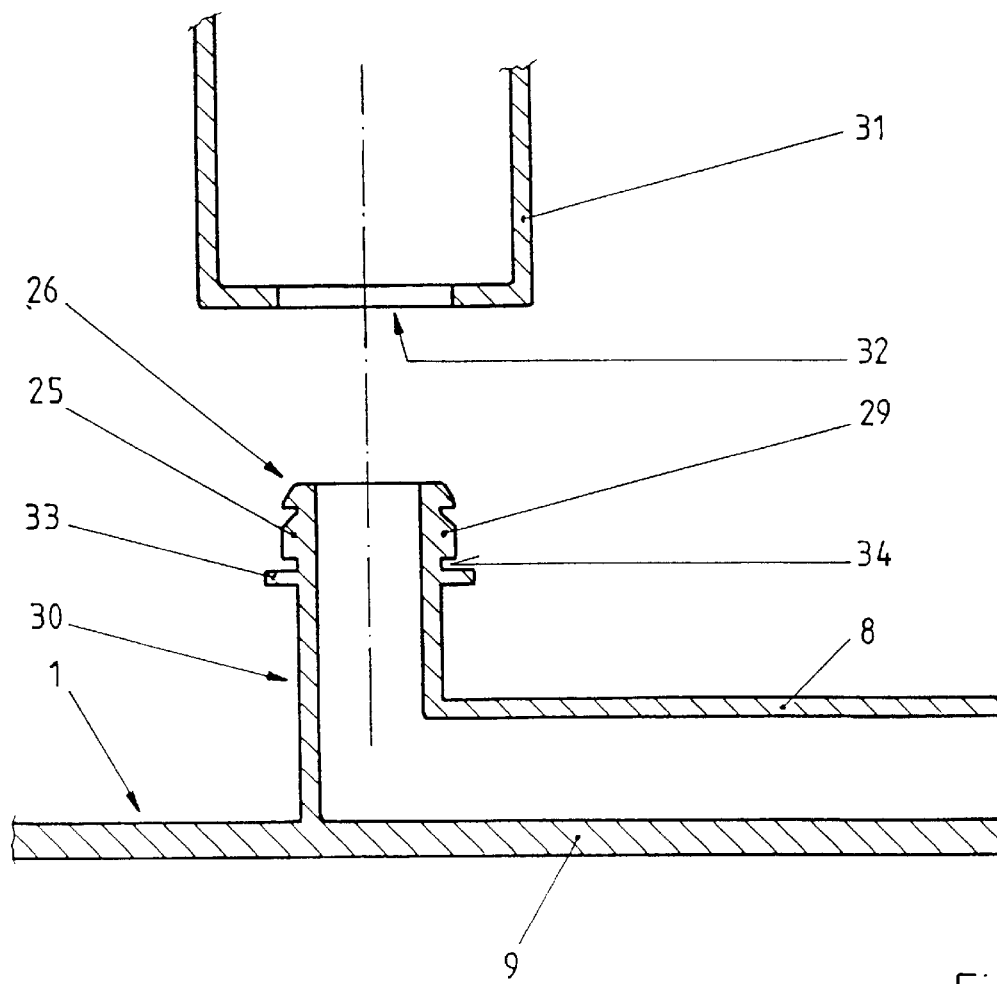
FIG. 6 shows a sectional representation of a section of line with a different connecting element.

FIG. 6 shows in a sectional representation a section of a line 8 moulded directly onto the tank bottom 9 of the plastic tank 1. The line 8 has in this case an end section 30, moulded onto which there is the connecting element 26, designed as a plug 25. A component 31, only sections of which are represented, is provided in this case with an opening 32, through which the plug 25 can be inserted in a sealing manner and, as a result, the component 31 is at the same time fixed in its installed position. The plug 25 has for this purpose not only the sealing lip 29 but also an extension 33, which serves as a stop for the plug 25 to be inserted into the opening. A sealing ring (not shown) can be inserted into a groove 34, so that even more demanding requirement [sic] for the tightness of the seal, in particular in the case of use in the high-pressure circuit of the fuel system, can be met. The plug 25 may also be equipped with an engaging element, for example a clip connection, so that a releasable or unreleasable fixing of the connected component 31 can be achieved without further aids.

What is claimed is:

1. Plastic tank, in particular a fuel tank of a motor vehicle for holding fuel, having a media-carrying line connected at least in certain sections to its wall, characterized in that at least one section of the media-carrying line is moulded directly onto a wall of the plastic tank by injection moulding.

2. Plastic tank according to claim 1, characterized in that the moulded-on line runs at least in certain sections parallel to the respective wall.

3. Plastic tank according to claim 1, characterized in that at least one section of the line runs in its interior and is moulded onto an inside wall.

4. Plastic tank according to claim 1, characterized in that at least one section of the line runs on the outside and is moulded onto an outside wall.

5. Plastic tank according to claim 2, characterized in that a web is formed between the wall and a section of line extending parallel thereto.

6. Plastic tank according to claim 2, characterized in that the web has at least one aperture.

7. Plastic tank according to claim 2, characterized in that the web has different thicknesses and/or heights over its length.

8. Plastic tank according to claim 1, characterized in that the line has an integral attachment to the plastic tank only in the region of a connection opening.

9. Plastic tank according to claim 1, characterized in that a connecting element is moulded on the media-carrying line.

10. Plastic tank according to claim 9, characterized in that the connecting element is designed at the same time for fixing a connected component.

11. Plastic tank according to claim 9, characterized in that the media-carrying line is arranged in a first half-shell of the plastic tank and the connecting element is designed for the connection of a further media-carrying line, arranged in a second half-shell.

12. Plastic tank, in particular a fuel tank of a motor vehicle, having a media-carrying line connected at least in certain sections to its wall, characterized in that at least one section of the media-carrying line is moulded directly onto a wall of the plastic tank by injection moulding and a connecting element is moulded on the media-carrying line, the connecting element further having a plug to be positively connected to a coupling.

13. Plastic tank according to claim 12, characterized in that the connecting element is designed for the connection of a sucking jet pump.

14. Process for the production of a plastic tank, in particular a fuel tank for a motor vehicle, which tank comprises at least one media-carrying line, characterized in that the plastic tank is made from at least two shells respectively produced by the injection-moulding process by means of a hollow mould and an inner mould engaging in the latter and designed as a core, a shaping of the mould having the effect that on an inside and/or outside wall of at least one of the shells at least one sprue body is moulded on, and in that subsequently a hollow space, forming the line, is formed in the sprue body by means of the internal gas pressure technique, in that a pressurized gas is fed into the mould via at least one channel, core material of the sprue body is blown out and is carried away with the gas, and subsequently the shells are connected to each other in a sealed manner.

15. Process according to claim 14, characterized in that the outer surface or the surrounding area of the said sprue body is cooled preferentially in the mould before the compressed gas is blown into the corresponding mould channels and the core of the sprue body is blown out along the desired path.

16. Process according to claim 15, characterized in that the sprue body is cooled preferentially along an angular or arcuate path and an unrectilinear hollow space is created.

* * * * *